Richard E. Hughes
INVENTOR.
BY
Schiller & Pandiscio
ATTORNEYS.

3,691,020
STYRENE PLANT WASTE HEAT UTILIZATION IN A WATER DESALINATION PROCESS
Richard E. Hughes, Belmont, Mass., assignor to The Badger Company, Inc., Cambridge, Mass.
Filed Aug. 20, 1971, Ser. No. 173,549
Int. Cl. B01d 3/02, 3/00, 1/28, 1/26, 15/00, 15/10
U.S. Cl. 203—25    12 Claims

ABSTRACT OF THE DISCLOSURE

Low temperature level waste heat recovered from the dehydrogenation reactor effluent of a styrene manufacturing unit is used in the flash evaporator of a water desalination unit to produce pure water from contaminated or high mineral content water.

---

Figure 1:
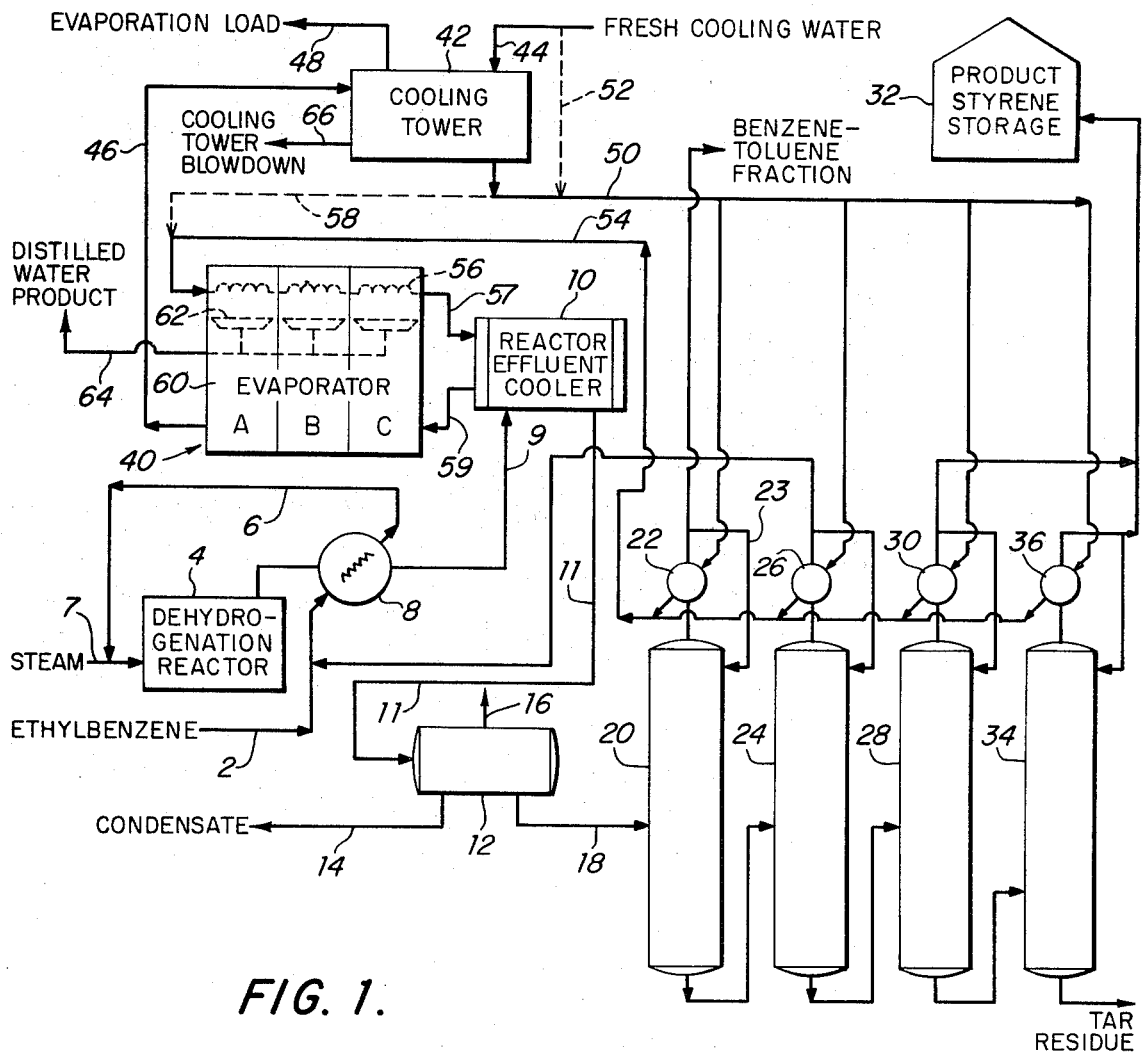

This invention relates to desalination of water utilizing waste heat from a chemical process, and more particularly to a water desalination system utilizing waste heat from a styrene manufacturing unit.

In the typical styrene manufacturing involving dehydrogenation of ethylbenzene in the presence of steam the effluent from the dehydrogenation reactor is heat exchanged with the incoming feed to recover high temperature level heat. Subsequently, the reactor effluent is cooled further to condense out steam and some high boiling organic by-products at a comparatively low temperature level and then passed to a fractional distillation section for separation and recovery of unreacted ethylbenzene, styrene and tar residue.

Although the heat removed in this secondary cooling and condensing step is at a low temperature level, the quantity of heat is quite large. Accordingly it has been suggested (see British Pat. 921,081 and U.S. Pat. 3,294,856) that this heat be recovered and used to generate low pressure steam or to provide a heating medium for distillation columns. However, many styrene plants are located in regions where it is necessary to treat brackish ground water or sea water to provide water suitable for human consumption and domestic and industrial uses. Such treatment is expensive, with a major cost being the heat required for vaporizing the water so as to effect separation and removal of impurities such as salt and other minerals.

Accordingly the chief object of this invention is to provide a method and apparatus system for utilizing some of the heat content of the dehydrogenation reactor effluent in a styrene plant to produce high purity water from a contaminated source such as salt or brackish water.

A further object of the invention is to provide a method and system for producing high purity water from contaminated or high mineral content sources by means of flash evaporation using waste heat recovered from a chemical process plant.

Still another object of the invention is to provide a styrene plant which includes a water desalination system in which high mineral content water is vaporized in a flash evaporator by means of low level waste heat recovered from the styrene reaction effluent.

The foregoing and other objects are achieved by providing a water desalination system comprising a flash evaporator in the cooling water loop of a styrene unit. The cooling water is pumped through coolers and condensers in the styrene unit to the tubes of the flash evaporator where it is used as the condensing medium for flashed water vapor which becomes the distilled water product. Then the cooling water is used to cool and partially condense the effluent of the dehydrogenation reactor whereby it recovers reactor effluent heat. This heat effectively raises the temperature of the cooling water so that it can be flashed down in the evaporator to produce a pure distilled water product which is recovered. The unvaporized portion of the cooling water is passed back to its source or preferably it is passed to a cooling tower where any remaining heat absorbed in its passage through the coolers and condensers of the styrene unit and in the reactor effluent cooler is dissipated. The cooled water from the cooling tower is reused in the styrene unit and the evaporator in a continuous cycle. Where a cooling tower is used, sufficient make-up water is required to compensate for water losses in the cooling tower and the distilled water recovered as product. As an optional feature, separate water streams may be used to service the styrene unit coolers and condensers as well as the desalination unit evaporator.

Figure 2:
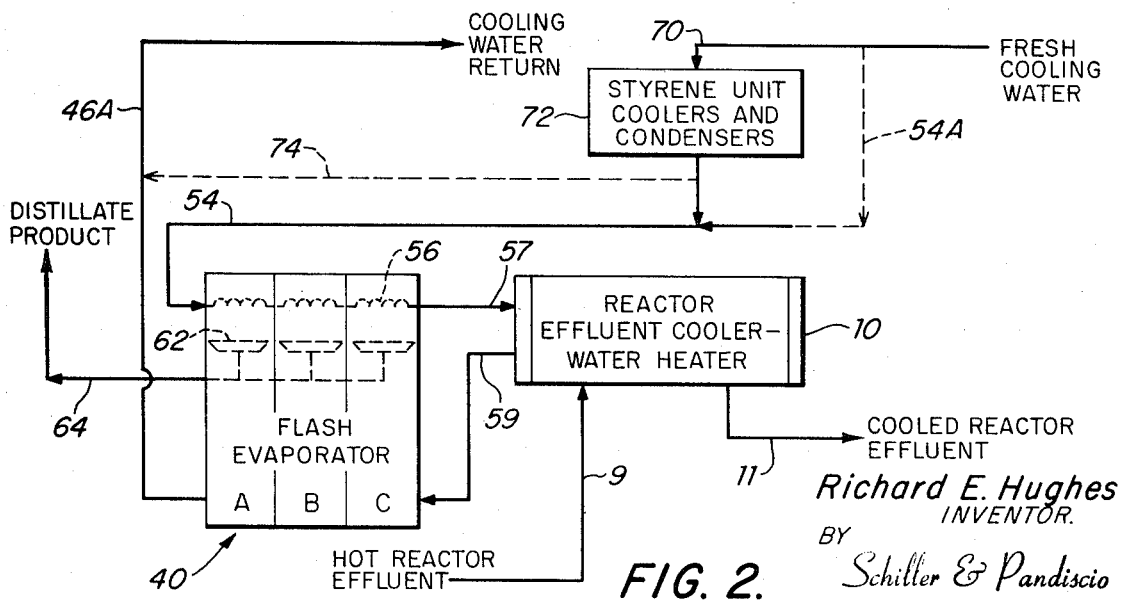

Other objects and many of the attendant advantages of the invention are described in or rendered obvious by the following detailed specification which is to be considered together with the accompanying drawings in which like reference numerals refer to like elements in the two figures. In the drawings:

FIG. 1 is a block diagram of a styrene unit embodying a preferred form of the water desalination system of this invention; and FIG. 2 shows an alternative form of the water desalination system.

Turning now to FIG. 1, the illustrated system embodies a typical arrangement of apparatus for producing styrene via the method of steam-dehydrogenation of ethylbenzene. An ethylbenzene feedstock is supplied via a line 2 and admitted to a reactor 4 in admixture with recycle ethylbenzene arriving from column 24 and steam concurrently delivered via a line 7. The reaction effluent, containing styrene, unreacted ethylbenzene, toluene, benzene, vent gases (such as hydrogen, carbon monoxide, carbon dioxide, ethane, ethylene, etc.), water and other by-products is heat exchanged in a heat exchanger 8 with the ethylbenzene to recover high temperature level heat and then is delivered via a line 9 to an effluent cooling heat exchanger 10 where it is cooled further by exchange of heat with cooling water so that steam and certain of its organic constituents are condensed at a relatively low temperature level. From cooler 10 the effluent is passed via a line 11 to a separator 12 where condensate (mostly water) is removed via a line 14 and vent gases are removed via a line 16. The styrene-containing liquid product effluent is removed from separator 12 and passed via a line 18 to a benzene-toluene column 20 which forms part of a multi-stage fractional distillation unit. The benzene-toluene column 20 is generally operated in such a manner that benzene and toluene are recovered as an overhead fraction while a styrene-rich fraction containing ethylbenzene is recovered as a bottoms product. The overhead fraction is condensed in a reflux condenser 22, with a portion being refluxed via a line 23 while the remainder may be passed to a fractionating column (not shown) to recover separate benzene and toluene concentrates or may be reused to form additional ethylbenzene. The styrene-rich bottoms fraction is passed to a second fractionating column 24 which is operated so as to produce a substantially pure ethylbenzene overhead fraction and a second styrene-rich bottoms fraction. The overhead fraction is condensed in a reflux condenser 26, with a portion being refluxed to column 24 and the remainder being recycled to reactor 4 via line 6. The bottoms fraction from column 24 is passed to a finishing column 28 to produce a substantially pure styrene overhead fraction and a bottom fraction containing some styrene, some ethylbenzene and styrene polymers, and other heavier residual compounds. The overhead fraction is condensed in a reflux condenser 30, with some of it being refluxed to column 28 and the remainder being passed to a product storage tank 32. The bottoms from finishing column 28 is passed to a residual finishing column 34 which is operated so as to recover a substantially pure styrene overhea dfraction and a bottoms consisting of tar residues and polymer by-products. The bottoms from column 34 is withdrawn from the system for disposal or further treatment. The overhead from column 34 is condensed in a condenser 36, with some of the condensate being refluxed and the rest being passed to storage tank 32. It is to be noted that the distillation unit comprising columns 20, 24, 28 and 34 is a conventional arrangement for recovering styrene, unreacted ethylbenzene, toluene and benzene from the reaction effluent and thus, need not be described in greater detail. Furthermore, it may be replaced by some other suitable arrangement for recovering the same materials from the reaction effluent. By way of example, the distillation unit above described may be replaced by the arrangements shown in U.S. Pats. 3,294,856 or 3,409,689. Still other suitable distillation units for the same purposes are well known to persons skilled in the art.

Recovery of low level waste heat from the effluent from reactor 4 according to the present invention involves provision of a flash evaporator 40. Flash evaporator 40 preferably consists of a plurality of stages, e.g., three stages, A, B, and C as shown, and may be of the type having either horizontal or vertical heating tubes. The number of stages depends upon how much distilled water is to be made. The evaporator is operated at sub-atmospheric pressure and requires no auxiliary heater elements since enough recoverable heat is available in the reactor effluent to permit vaporization of the water to be distilled.

In the preferred embodiment of FIG. 1, the evaporator 40 is incorporated within the cooling water loop of the reaction effluent processing equipment together with a cooling tower 42, so that the heat used in the evaporator may be finally rejected to the atmosphere. The cooling tower may be of any convenient design and may include air circulating fans that are electrically or wind-driven. As shown in FIG. 1, fresh feed water to be distilled is introduced to the tower 42 via a line 44 while water discharging from the last stage of the evaporator is recycled to the tower via a line 46. Loss of water from the tower by evaporation is indicated schematically by line 48. Cooled water from tower 42 is pumped via a line 50 to cooler and condensers in the reaction effluent processing equipment, e.g., condensers 22, 26, 30 and 36. It is to be noted that other cooling heat exchangers in addition to the condensers 22, 26, 30 and 36 may be associated with columns 20, 24, 28 and 34 or with other equipment (not shown) that may be included in the distillation unit, and that such additional heat exchangers may be cooled with water from tower 42. Optionally, some or all of the fresh feed water normally introduced to the tower may be passed directly to coolers and condensers in the reaction effluent processing equipment as indicated by line 52. After passing through users such as condensers 22, 26, 30 and 36, the cooling water is directed via a line 54 through the heating tubes 56 of the several stages of flash evaporator 40. As an optional measure, some or all of the cooling water from tower 42 and/or some or all of the makeup fresh feed water may be passed directly to the evaporator heating tubes as indicated by line 58. The cooling water passes serially through the heating tubes of evaporator stages A, B, and C and then via lines 57 and 59 through one side of reactor effluent cooler 10 back to the evaporator where it passes in turn through the flash chambers 60 of successive evaporator stages countercurrent to its direction of flow through the evaporator stages via the evaporator heating tubes. In passing through cooler 10 the cooled water removes reactor effluent heat by cooling and condensing the effluent. This heat effectively raises the temperature of the cooling water so that it can be flashed down in the flash chamber 60 of the evaporator.

The flashed vapor is condensed by exchange of heat with the cooling water flowing in the heating tubes 56 to form a pure distilled water product that is collected in collecting trays 62 and recovered via a line 64. Residual cooling water is discharged from the last stage of the evaporator and directed via line 46 to cooling tower 42 where remaining heat absorbed in the effluent cooler 10 and the other condensers and coolers of the reactor effluent processing equipment is dissipated and rejected to the atmosphere. Thereafter the cooled water is recirculated via line 50 (and/or 58) for reuse in the manner above described. Sufficient makeup feed water is introduced via line 44 to compensate for (a) evaporation losses in the cooling tower, (b) cooling tower blowdown, and (c) the water recovered from the evaporator as pure distillate product. A blowdown is taken from tower 42 via a line 66. This blowdown is adjusted so as to maintain a desired dissolved solids content in the circulating cooling water.

FIG. 2 shows an alternative embodiment of the invention. This embodiment uses water on a once through basis and is especially suitable when the styrene plant is located in proximity to a large source of water such as the ocean. Although not shown, it is to be understood that the apparatus arrangement of FIG. 2 is associated with reactor effluent processing equipment such as the fractional distillation unit shown in FIG. 1. Furthermore, numerals used in FIG. 1 are used to designate the same equipment in FIG. 2, and, except as may be otherwise stated, the equipment, material requirements, and operating conditions are the same as what is herein described in connection with the system of FIG. 1.

Referring now to FIG. 2, fresh cooling water from an available source such as the ocean or a river is fed via a line 70 to the styrene unit coolers and condensers which are represented collectively at 72. By way of example, the styrene unit coolers and condensers may comprise one or more of the condensers 22, 26, 30 and 36 of FIG. 1. After passing through the styrene unit coolers and condensers, the cooling water is passed via line 54 through the heating tubes of evaporator 40 to and through one side of the reactor effluent cooler 10 where it picks up heat from the reactor effluent. The now heated cooling water then passes back through the evaporator's flashing chambers where vaporization occurs as above described. The cooling water passing through heating tubes 56 condenses the flashed water vapor which is collected in trays 62 to form the distilled water product. This product is recovered via line 64. Cooling water discharging from the last stage flashing chamber of the evaporator is returned via line 46A to its original source. Using the same cooling water to serve both the styrene unit coolers and condensers as well as evapoator 40 and reactor effluent cooler 10 minimizes total cooling water flow. Where the supply of cooling water is a relatively large body of water such as the ocean it may be preferable to have the cooling water from the styrene unit condensers and coolers return directly to the source via a line 74 as shown and to use a separate cooling water stream introduced to line 54 via a line 54A to serve the evaporator 40 and effluent cooler 10.

It is believed to be apparent that in both of the systems described above the low level heat in the reactor effluent passing out of heat exchanger 8 is recovered and utilized in a manner that is effective to produce a valuable product—namely, a relatively pure water suitable for drinking or industrial uses from a contaminated or high mineral content source.

Following is a specific example of a preferred mode of practicing the invention employing the system of FIG. 1.

EXAMPLE

Steam at a temperature of about 1400° F. and ethylbenzene (including recycle ethylbenzene) at a temperature of about 350° F. are admixed and fed to reactor 4 at the rate of about 2.5 pounds of steam to 1.0 pound of ethylbenzene per minute. Heating of the ethylbenzene to the 350° F. temperature is accomplished by passing it through heat exchanger 8. The reactor which contains a dehydrogenation catalyst comprising an oxide of iron is operated at a low pressure and a temperature of 1050–1175° F. The total reaction product effluent is withdrawn from the reactor at a rate of about 8000 pounds per minute and at a temperature of about 1000–1100° F. and is cooled to a temperature of about 350° F. in passing through heat exchanger 8.

Fresh makeup sea water is introduced to cooling tower 42 at a temperature of about 90° F. and at a rate of about 5440 gallons per minute. From the cooling tower cooling water at a temperature of about 90° F. is delivered via line 50 to the condensers 22, 26, 30, and 26 and then via line 54 to the heating tubes 56 of evaporator 40 at a rate of about 26,000 gallons per minute. The cooling water is at a temperature of about 103° F. as it enters the evaporator and is heated to a temperature of about 131° F. before it exits the evaporator via line 57 and passes to the effluent cooler 10. In the effluent cooler, the reaction effluent gives up heat to the cooling water. The effluent leaves cooler 10 at a temperature of about 175° F. while the cooling water passes from cooler 10 to the evaporator's flashing chambers via line 59 at a temperature of about 155° F. The effluent passes from cooler 10 to separator 12 where condensate is removed via line 14 and vent gas, including hydrogen, carbon monoxide, carbon dioxide, ethene, ethylene, etc, is expelled from the system via line 16. The effluent thereafter is passed to the column 20. The columns 20, 24, 28 and 34 are operated at approximate base pressures of 250, 220 100, and 100 mms. of mercury; and corresponding approximate base temperatures of 220, 220, 190, and 220° F. respectively.

Since the cooling water is cooled as it passes in turn through the flashing chambers of stages C, B, and A respectively, it is necessary to operate these stages at different pressures in order to effect flashing therein. For this reason, the flashing chambers 60 of evaporator stages A, B, and C are operated at pressures of about 100, 130, and 165 mm. of mercury respectively. At such pressures, flashing occurs in stages A, B, and C at temperatures of about 127, 137, and 146° F. respectively.

The flashed vapor is condensed by exchange of heat with the cooling water circulating through the tubes 60 of the evaporator and the condensate collects in trays 62. Distilled water product is recovered from the evaporator at a rate of about 700 gallons per minute and a temperature of about 127° F. Unflashed cooling water is recovered from the evaporator at a temperature of about 127° F. and passed at a rate of about 25,300 gallons/minute to the cooling tower 42 via line 46. About 940 gallons/minute of water is lost by evaporation from the tower and a blowdown stream of about 3800 gallons/minute is removed from the tower via line 66 to maintain a desired dissolved solids content in the cooling water that circulates through the cooling water loop of the reaction effluent processing equipment. The purity of the distilled water product is comparable to what is obtainable by conventional water distillation plants.

It is believed to be obvious that the styrene unit may be operated in a manner other than as described and still permit successful recovery of low level waste heat and production of distilled water according to the principles of this invention. Furthermore, the invention is not limited to the specific operating conditions herein described. Thus the evaporator may have only one stage although at least two or three stages are preferred. Furthermore, the number of condensers and coolers serviced by the cooling water, the size of the cooling tower and the use of a common separate cooling water streams to service the evaporator and the reaction effluent processing equipment is a matter of choice and may be dictated by the quantity and quality of the available cooling water.

I claim:

1. In a process involving dehydrogenation of ethylbenzene in the presence of steam in a dehydrogenation reactor to produce styrene and fractionally distilling the dehydrogenation reaction effluent in a multi-stage distillation unit having distillate cooling heat exchangers to separately recover styrene and dehydrogenation reaction by-products, the method of producing relatively high purity water from a feed water that contains impurities that are separable by distillation comprising, passing said feed water through the condensing section of a flash evaporator to a dehydrogenation reaction effluent cooler, passing said dehydrogenation reaction effluent from said reactor to said multi-stage distillation unit via said cooler at a temperature above the temperature at which said feed water is passed to said cooler, cooling said reaction effluent in said cooler by exchange of heat with said feed water, passing said feed water from said cooler to the evaporation section of said evaporator, flash evaporating at least some of the said feed water in said evaporation section and condensing the resulting water vapor by exchange of heat with the feed water in said condensing section, recovering unvaporized feed water from said evaporation section and cooling said unvaporized feed water by passing it through a cooling tower, recirculating at least some of said cooler feed water to said condensing section, and recovering said condensed water vapor from said condensing section.

2. A process according to claim 1 further including the step of passing at least some of the feed water recovered from said evaporation section back to the source of said feed water.

3. A process according to claim 1 wherein some of said cooled feed water is recirculated to said evaporator and the remainder is withdrawn as blowdown, and further wherein an additional supply of feed water is supplied to the feed water circulating loop, whereby to compensate for feed water losses through evaporation, blowdown and distillate product recovery, and to maintain a controlled impurity content in the circulating feed water.

4. A process according to claim 1 wherein said evaporator is a multi-stage flash evaporator.

5. A process according to claim 1 wherein said feed water is passed through distillate cooling heat exchangers of said multi-stage distillation unit before it is passed to the condensing section of said evaporator.

6. In a system for the production of styrene comprising a dehydrogenation reactor; means for continuously feeding an ethylbenzene feedstock and steam to said reactor so as to convert said ethylbenzene to styrene; a muli-stage distillation unit for fractionally distilling the effluent from said reactor to separate and recover styrene and reaction by-products; said distillation unit having means including reflux condensers for condensing and refluxing overhead vapors in a least some of the stages thereof; and a reactor effluent cooler connecting said reactor and said distillation unit; the improvement comprising a flash evaporator having a vaporizing section, a vapor condensing section communicating with said vaporizing section, and heat exchanger means in said condensing section for effecting condensation of vapors in said condensing section by heat exchange with a cooling medium fed to said heat exchange means; means for feeding an impure cooling water to said heat exchanger means; means for passing said cooling water from said heat exchanger to said reactor effluent cooler so that said cooling water is heated and said reactor effluent cooled by exchange of heat; means for passing said heated cooling water to the vaporizing section of said evaporator so that at least part of said heated cooling water is flash vaporized; means connected to said evaporator for separately removing vaporized cooling water and condensed cooling water from the vaporizing and condensing sections of said evaporator; means for circulating at least some of the unvaporized cooling water removed from the vaporizing section of said evaporator back to the condensing section of said evaporator, said recirculating means including means for cooling said unvaporized cooling water before it is reintroduced to said condensing section; and means for circulating said unvaporized cooling water through at least some of said reflux condensers before it is reintroduced to said evaporator condensing section.

7. The combination of claim 6 further including means for introducing make-up cooling water to the cooling water circulaing loop comprising said cooling means, evaporator and reaction effluent cooler; and means for withdrawing a blow-down stream of cooling water from said loop.

8. The combination of claim 7 wherein said cooling water cooling means is a cooling tower.

9. The combination of claim 8 wherein said blow-down stream is taken from said cooling tower.

10. In a process involving dehydrogenation of ethylbenzene in the presence of steam in a dehydrogenation reactor to product styrene and fractionally distilling the dehydrogenation reaction effluent in a multi-stage distillation unit having distillate cooling heat exchangers to separately recover styrene and dehydrogenation reaction by-products, the method of producing relatively high purity water from a feed water that contains impurities that are separable by distillation comprising, passing said feed water through the distillate cooling heat exchanges of said multi-stage distillation unit; passing said feed water from said heat exchangers through the condensing section of a flash evaporator to a dehydrogenation reaction effluent cooler, passing said dehydrogenation reaction effluent from said reactor to said multi-stage distillation unit via said cooler at a temperature above the temperature at which said feed water is passed to said cooler, cooling said reaction effluent in said cooler by exchange of heat with said feed water, passing said feed water from said cooler to the vaporizing section of said evaporator, flash evaporating at least some of the said feed water in said evaporation section and condensing the resulting water vapor by exchange of heat with the feed water in said condensing section, recovering unvaporized feed water from said evaporation section and recovering said condensed water vapor from said condensing section.

11. A process according to claim 10 further including the step of passing at least some of the feed water recovered from said evaporation section back to the source of said feed water.

12. In a system for the production of styrene comprising a dehydrogenation reactor; means for continuously feeding an ethylbenzene feedstock and steam to said reactor so as to convert said ethylbenzene to styrene; a multi-stage distillation unit for fractionally distilling the effluent from said reactor to separate and recover styrene and reaction by-products; said distillation unit having means including reflux condensers for condensing and refluxing overhead vapors in at least some of the stages thereof; and a reactor effluent cooler connecting said reactor and said distillation unit; the improvement comprising a flash evaporator having a flashing section, a vapor condensing section receiving vapor from said flashing section, and heat exchanger means in said condensing section for effecting condensation of vapors in said condensing section by heat exchange with a cooling medium fed to said heat exchange means; means for feeding a relatively high impurity cooling water to said heat exchanger means; means for passing said cooling water from said heat exchanger to said reactor effluent cooler so that said cooling water is heated and said reactor effluent cooled by exchange of heat; means for passing said heated cooling water to the flashing section of said evaporator so that at least part of said heated cooling water is flash vaporized; means connected to said evaporator for separately removing concentrated cooling water and condensed vaporized cooling water from the flashing and condensing sections of said evaporator respectively; and means for recirculating said concentrated cooling water removed from the flashing section of said evaporator back to the condensing section of said evaporator, said recirculating means including a cooling tower for cooling said concentrated cooling water before it is reintroduced to said condensing section.

References Cited
UNITED STATES PATENTS

| | | | |
|---|---|---|---|
| 2,385,166 | 9/1945 | Singleton et al. | 260—669 R |
| 2,851,502 | 9/1958 | Bowman et al. | 260—699 R |
| 3,213,000 | 10/1965 | Ewing | 159—2 MS X |
| 3,256,355 | 6/1966 | Gilman et al. | 260—669 R |
| 3,463,216 | 8/1969 | Miles II | 202—174 X |
| 3,294,856 | 12/1966 | Huckins, Jr. | 260—669 R |
| 3,467,587 | 9/1969 | Connell et al. | 202—173 |
| 3,489,652 | 1/1970 | Williamson | 203—11 |
| 3,580,818 | 5/1971 | DeVilliers et al. | 159—2 MS X |

FOREIGN PATENTS

| | | | |
|---|---|---|---|
| 921,081 | 3/1963 | Great Britain | 159—Dig 10 |

NORMAN YUDKOFF, Primary Examiner

J. SOFER, Assistant Examiner

U.S. Cl. X.R.

203—80; 202—173; 260—669 R, 674; 159—2 MS, 17 VS